Aug. 18, 1964

S. I. CHIARELLO 3,144,851

SONIC SIGNAL

Filed Oct. 10, 1961

3 Sheets-Sheet 1

INVENTOR:
Sesto I. Chiarello

By Smyth, Roston & Pavitt
Attorneys

SONIC SIGNAL

Filed Oct. 10, 1961 3 Sheets-Sheet 2

INVENTOR:
Sesto I. Chiarello
By Smyth, Roston & Pavitt
Attorneys

Aug. 18, 1964 S. I. CHIARELLO 3,144,851

SONIC SIGNAL

Filed Oct. 10, 1961 3 Sheets-Sheet 3

INVENTOR:
Sesto I. Chiarello

By Smyth, Roston & Pavitt
Attorneys

United States Patent Office 3,144,851

Patented Aug. 18, 1964

3,144,851
SONIC SIGNAL

Sesto I. Chiarello, Los Angeles, Calif., assignor to Packard-Bell Electronics Corporation, Los Angeles, Calif., a corporation of California Filed Oct. 10, 1961, Ser. No. 144,126
14 Claims. (Cl. 116—137)

The present invention relates to a new and improved transmitter and more particularly to a transmitter that is adapted to project a beam of sonic signals suitable for actuating a remote control system.

It is frequently desirable to be able to remotely control an apparatus from a location separated from the apparatus. For example, when a viewer is watching a television receiving set he is normally a sufficient distance from the set to make adjustment thereof very inconvenient. In order to enable the viewer to adjust the volume and/or station of a television set from a distant observation point, it has been proposed to provide a sonic receiver in the television set which will be capable of adjusting the television set in response to sonic signals. The viewer may then be provided with a transmitter that may be carried in his hand and is capable of transmitting one or more suitable sonic signals to the sonic receiver and thereby causing the sonic receiver to make the desired adjustments of the television set.

In order for such a sonic transmitter to be commercially attractive, it must not only be a small, compact, lightweight device that is simple to operate, but it must also be economical to produce and sufficiently durable to operate for extended periods of time with little or no service. At the present time the sonic transmitters most widely used employ tuning rods which are capable of mechanically vibrating at the required frequencies and radiating beams of sonic signals. A hammer or similar device is also provided to strike one or more of the rods and cause it to vibrate. In order to be capable of two directional controls, for example, for increasing and decreasing the station frequency or increasing and decreasing the volume, it has been customary to provide a pair of separate frequencies for each control that is to be adjusted. Thus, if, for example, it is desired to increase the volume, one of the tuning rods is struck to produce a signal of one frequency while if it is desired to decrease the volume, another tuning rod is struck to produce a signal of another frequency. In the past, it has been customary to provide a separate manual control for each of the tuning rods in the transmitter. As a result, if the volume is to be increased, a first control member is manually moved, while if it is desired to decrease the volume a second and separate control is manually moved. This has resulted in transmitters that are not only expensive to manufacture, but are also so large and bulky as to be difficult to hold in a single hand while operating the controls thereof. In addition, this results in the number of controls on the sonic transmitter being different than the number of controls on the television set. Also, the mode of actuating the controls on the transmitter is different from the mode of actuating the controls on the television set when a single knob is provided for each control so that the knob may be rotated in either direction.

It is now proposed to provide a sonic transmitter or signalling device particularly adapted for use in remotely adjusting a television set and in which the controls are similar in number and mode of operation to those on the television set. In addition, the transmitter will be made very economically and sufficiently compact to be easily held in one hand even during use thereof. This is to be accomplished by providing a sonic transmitter with only a single manually actuatable control member for each of the controls on the television set that are to be adjusted.

More particularly, a housing is provided that has a size that may easily be hand-held and includes a pair of tuning rods and a pair of hammers for each control on the transmitter together with a single manually actuatable control member such as a wheel. The control member includes a separate but reversed one-way drive means for each of the hammers. When one of the controls on the television set is to be adjusted the control member on the transmitter may be moved in a first direction and cause a first hammer to be cocked and released so as to strike the first tuning rod and cause it to vibrate. If the same control member is moved in the reverse direction, this will cause the second hammer to be cocked and released so as to strike the second tuning rod and produce a sonic signal. It may thus be seen that a sonic signal or transmitter has been provided that will permit an adjustment of the television set to be made by the manual manipulation of controls in substantially the same manner as on the television set.

Figure 1:
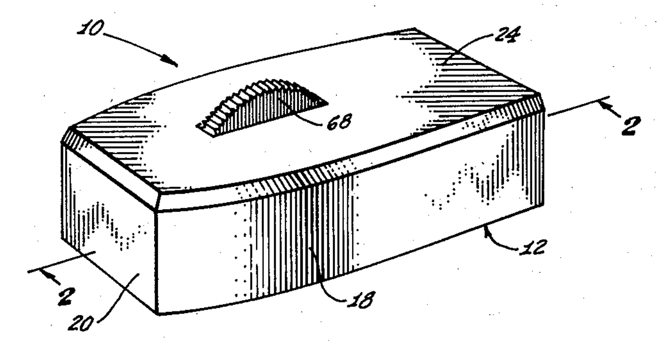
FIGURE 1 is a perspective view of a sonic signal or transmitter embodying one form of the present invention.
Figure 2:
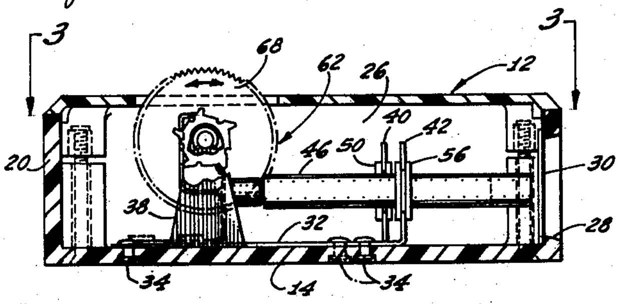
FIGURE 2 is a transverse cross-sectional view of the transmitter taken substantially as indicated by the line 2—2 in FIGURE 1.

Referring to the drawings in more detail and particularly to FIGURES 1 through 8, the present invention is embodied in a sonic signal or transmitter 10 especially adapted to transmit beams of sonic energy suitable for actuating the controls in a device such as a television receiver. The transmitter may be adapted to increase and decrease the volume or to increase and decrease the station frequency or any other desired adjustments.

The transmitter 10 comprises a housing 12 which may be a molded plastic unit having a plane base portion 14 with upwardly projecting walls 16, 18, 20 and 22 therearound. A cover 24 may be removably secured to the tops of the walls 16 to 22, inclusive, to enclose the space therebetween and form a chamber 26. The housing 12 is preferably of a compact size and shape that is suitable for being conveniently held in a person's hand.

The end wall 22 of the housing 12 may be provided with a rectangular opening 28 through which the sonic signals may be projected. If desired, the opening 28 may be closed by means of a screen 30 that will not interfere with signals being projected therethrough.

In order to support the operative elements of the transmitter 10 within the housing 12, a metal frame 32 may be provided which has a flat portion that is secured to the base 14 of the housing 12 by any suitable means such as rivets 34. The frame 32 includes a pair of parallel flanges 36 and 38 which project upwardly from the sides thereof and a pair of fingers 40 and 42 that project upwardly from the end thereof.

In order to produce the sonic signals means are provided that are adapted to produce or generate vibrations of the desired frequencies. In the present instance this means includes a separate tuning rod 46 and 48 for each frequency that it is desired to transmit. The first tuning rod 46 is a cylindrical member that has a resilient grommet 50 bonded thereto so that the tuning rod 45 may be mounted in the finger 40 so as to extend longitudinally of the chamber 26. The grommet 50 is preferably disposed adjacent a nodal point on the rod 46 such as at the center of the rod 46 so as not to excessively dampen the vibrations. The outer end 52 of the tuning rod 46 is disposed adjacent the screen 30 while the inner end 54 terminates adjacent the flanges 36 and 38. The length of the rod 46 is selected so that when it vibrates in an axial mode it will vibrate at the desired frequency and will project a beam of sound from the outer end 52 thereof through the screen 30.

The second tuning rod 48 is similar to the first one 46 in that it is mounted on the finger 42 by means of a rubber grommet 56 that is bonded onto the center of the rod. The second tuning rod 48 is positioned substantially parallel to the first tuning rod 46 with the inner end 58 thereof terminating at approximately the same spacing from the flanges 36 and 38. The outer end 60 of the rod 48 is directed toward the screen 30 so that when the tuning rod 48 vibrates it will project a beam through the screen 30. The second tuning rod 48 has a length which is selected to produce vibrations at a frequency which differs from the first frequency produced by the first tuning rod 46. The difference in the frequency is preferably only sufficient to permit the sonic receiver in the television set to easily distinguish therebetween and adjust the television set in response thereto.

In order to actuate or excite the tuning rods 46 and 48 into vibrating, a striker assembly 62 is provided in the chamber 26 that includes a first hammer 64, a second hammer 66 and a manually rotatable wheel 68 for causing the hammers 64 and 66 to strike tuning rods 46 and 48, respectively. The wheel 68 is preferably a single plastic member that is molded around a steel shaft 70. The opposite ends of the shaft 70 are adapted to fit into openings adjacent the upper ends of the flanges 36 and 38. The periphery of the wheel may be serrated and adapted to project through an opening 72 in the cover 24. It is thus apparent a person holding the transmitter 10 can easily rotate the wheel 68 with his thumb or ring. The wheel 68 also include cog wheels 74 and 76 on the opposite sides thereof. Each of the cog wheels 74 and 76 includes a series of teeth 78 and recessed detents 80 that are spaced therearound.

Figures 3, 4:
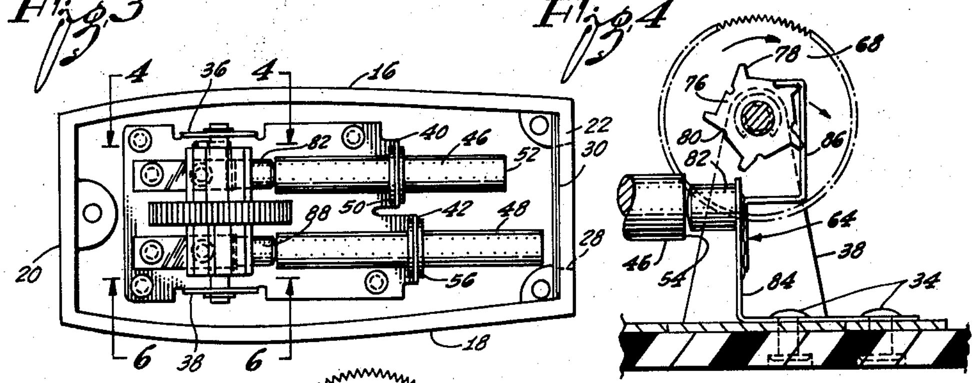
FIGURE 3 is a plan cross-sectional view of the transmitter taken substantially along the plane of line 3—3 in FIGURE 2.
FIGURE 4 is a fragmentary cross-sectional view taken substantially along the plane of line 4—4 of FIGURE 3 and showing a portion of one of the tuning rods and hammer means therefor.
Figure 6:
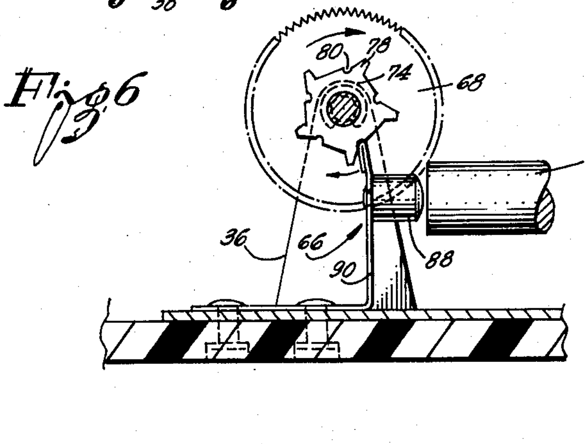
FIGURE 6 is a side elevational view taken subtantially along the plane of line 6—6 of FIGURE 3 and showing a portion of the other of the tuning rods and the hammer means therefor.
Figure 7:
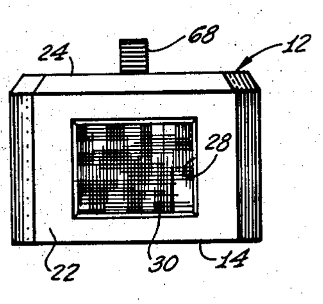
FIGURE 7 is an end view of the sonic signal or transmitter of FIGURE 1.
Figure 8:
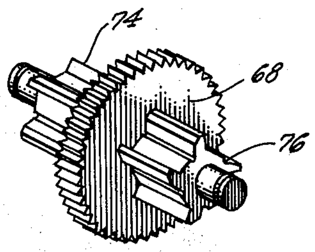
FIGURE 8 is a perspective view of the control wheel employed in the sonic signal or transmitter of FIGURE 1.

The first hammer 64 includes a small metal cylinder 82 that is secured to the upper end of a spring 84. The spring 84 consists of a strip of resilient material that is bent into an L shape with the base thereof riveted to the frame 32 so as to position the cylinder 82 immediately adjacent the end of the tuning rod 46. In addition, a wire arm 86 may be soldered or otherwise secured to the upper end of the spring 84 so as to project upwardly around the shaft 70 to engage the cog wheel 76 adjacent the top thereof. When the wheel 76 is disposed in its normally inactive position, the upper end of the wire arm 86 will rest in one of the recessed detents 80 substantially as shown in FIGURE 4. This will retain the cylinder 82 slightly spaced from the end 54 of the tuning rod 46.

Figure 5:
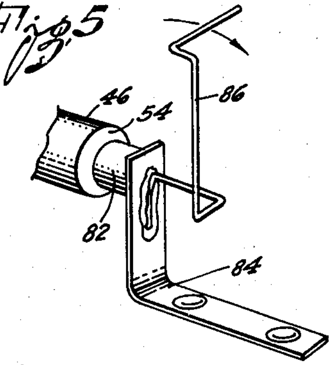
FIGURE 5 is a fragmentary perspective view of a portion of the hammer means of FIGURE 4.

If the wheel 68 is rotated in the direction indicated by the arrow in FIGURE 5, the upper end of the arm 86 will engage the next succeeding tooth 78. As the wheel 68 continues to rotate, the arm 86, and therefore the spring 84 and cylinder 82 will be forced in the same general direction. Eventually the wheel 68 will rotate a sufficient distance to cause the arm 86 to ride over the top of the tooth 78. When this occurs, the spring 84 will be free to violently swing forwardly and carry the cylinder 82 against the end 54 of the tuning rod 46. This in turn will cause the entire tuning rod 46 to vibrate in an axial mode at the desired freqeuncy whereby a signal of corresponding frequency will be radiated through the screen 30. If the wheel 68 is rotated in the opposite direction, the arm 86 will be engaged by a recessed detent 80 and a tooth 78 and forced against the end 54 of the tuning rod 46 to thereby dampen out any vibrations therein.

The second hammer 66 includes a small metal cylinder 88 that is secured to the upper end of a spring 90. The spring consists of a strip of resilient material that is bent into an L shape. The base of the spring 90 is secured to the frame 32 by riveting or other suitable means. The spring 90 is positioned so that the upper end which is folded over normally seats in one of the recessed detents 80 in the cog wheel 74. If the wheel 74 is rotated in a direction indicated by the arrow in FIGURE 6, the end of the spring 90 will engage the back of the next succeeding tooth 78 and be deflected to thereby move the cylinder 88 away from the tuning rod. After the wheel 68 has rotated a sufficient distance, the tooth 78 will clear the end of the spring 90 and the spring 90 will be released to violently carry the cylinder 88 against the end of the tuning rod 48. This in turn will cause the tuning rod 48 to vibrate at its particular frequency to thereby radiate a corresponding signal through the screen 30.

In order to utilize the present transmitter for adjusting a television set, the end 22 of the transmitter 10 is directed toward the television set and the control wheel 68 is rotated in whichever direction is required to accomplish the desired adjustment. More particularly, if it is desired to increase the station frequency or the volume and this may be accomplished by radiating a frequency corresponding to the resonant frequency of the tuning rod 46, the wheel 68 would be rotated in the direction indicated by the arrow of FIGURE 5. When the wheel 68 is rotated in this direction, the upper end of the spring 90 will be engaged by a detent 80 and tooth 78 or cog wheel 74 so as to force the cylinder 88 against the end of the tuning rod 48. This will prevent the tuning rod 48 from vibrating or radiating any form of signal. At the same time, however, as the wheel 68 continues to rotate, the arm 86 will be engaged by the back side of a tooth 78 or cog wheel 76 and deflected thereby. This will draw the cylinder 82 away from the end of the rod 46 until the arm 86 rides over the top of the tooth 78. When this occurs, the spring 84 will be released and will carry the metal cylinder 82 against the end of the tuning rod 46 thereby causing it to radiate a signal of the frequency required to produce the desired adjustment of the television set.

If it is desired to make an adjustment of the character produced as a result of frequencies corresponding to those produced by rod 48, for example, decreasing the frequency or volume, this may be accomplished by rotating the wheel 68 in the opposite direction. When this rotation occurs, the arm 86 will engage a detent 80 and a tooth 78 and the cylinder 82 will be deflected against the tuning rod 46 to prevent any vibrations thereof. At the same time, a tooth 78 will engage the end of the spring 90 to deflect it so as to carry the cylinder 88 away from the tuning rod 48. When the end of the spring rides over the end of the tooth 78, the spring 90 will be released and the cylinder 88 will be driven against the end of the tuning rod 48 to cause it to vibrate. This in turn will result in radiating a signal of the frequency required to produce the intended adjustment of the television set.

Although the foregoing embodiment is particularly useful for producing signals of two different frequencies, it may be desirable for the transmitter to be capable of producing a larger number of signals having different frequencies. For example, it may be desirable for a single transmitter to be capable of adjusting both the channel or station frequency and also the volume at which the television set is operating. In this event, the embodiment of the invention shown in FIGURES 9, 10 and 11 may be employed.

In this embodiment the transmitter 110 comprises a housing 112 similar to that of the first embodiment. The housing 112 may be a molded plastic unit having a plane base 114 with a plurality of upwardly projecting walls 116, 118, 120 and 122. A cover 124 may be removably secured to the tops of the walls 116, 118, 120 and 122 to enclose the space therebetween so as to form a chamber 126. As will become apparent, the size of the housing 112 in this embodiment is somewhat larger than in the first embodiment. However, it may still be sufficiently compact to be conveniently held in a person's hand so as to be operable by making the controls with a finger or thumb.

One of the end walls 122 may be provided with a pair of openings 128 and 129 through which the sonic signals may be projected. If desired, these openings 128 and 129 may also be covered with a decorative screen 130 similar to the one in the first embodiment.

In order to support the operative elements within the chamber 126, a pair of metal frames 132 and 133 substantially identical to the frame 32 in the first embodiment may be secured to the base 114 of the housing 112. Each of the frames 132 and 133 includes a pair of fingers 140–141 and 142–143 on the ends and a pair of flanges 136–137 and 138–139 on the sides.

A first and second pair of tuning rods 146–147 and 148–149 are secured in place by the fingers 140, 141, 142 and 143 by means of rubber grommets 150 that are bonded to the centers of the rods. The inner ends of these rods terminate adjacent the flanges 136 to 139, inclusive, while the outer ends terminate adjacent the screen 130 so as to radiate sound therethrough. The length of one pair of rods 146–147 are selected so that they will be effective to produce signals having frequencies suitable for adjusting the channel to which the television set is tuned. One tuning rod 146 is preferably suitable for increasing the frequency while the other rod 147 is suitable for decreasing the frequency. The other pair of rods 148–149 are selective to produce signals suitable for increasing or decreasing, respectively, the volume of the set.

In order to excite the rods 146–147 or 148–149 into vibrating, striker assemblies 162 and 163 are provided. Each of the assemblies includes a first hammer 164–165, a second hammer 166–167 and a control wheel 168–169. The control wheels 168–169 are preferably a plastic member molded into essentially the same shape as in the first embodiment. Each wheel is mounted on a steel shaft 170 or 171 journalled in the flanges 136 to 139, inclusive. The opposite sides of each wheel 168–169 have cog wheels 174–175 or 176–177 thereon that are effective to selectively actuate the hammers. Each of the hammers 164–165 and 166–167 include a metal cylinder 182–183 or 188–189 secured to the ends of leaf springs 184–185 or 190–191. The springs 184–185 include arms 186 that engage the tops of the cog wheels 176–177 while the ends of the leaf springs 190–191 engage the bottom of the cog wheels 174–175.

From the foregoing description, it may be seen that each pair of control rods and the striker assemblies therefor are similar to the corresponding parts in the first embodiment and work in the same manner.

Figures 9, 10, 11:
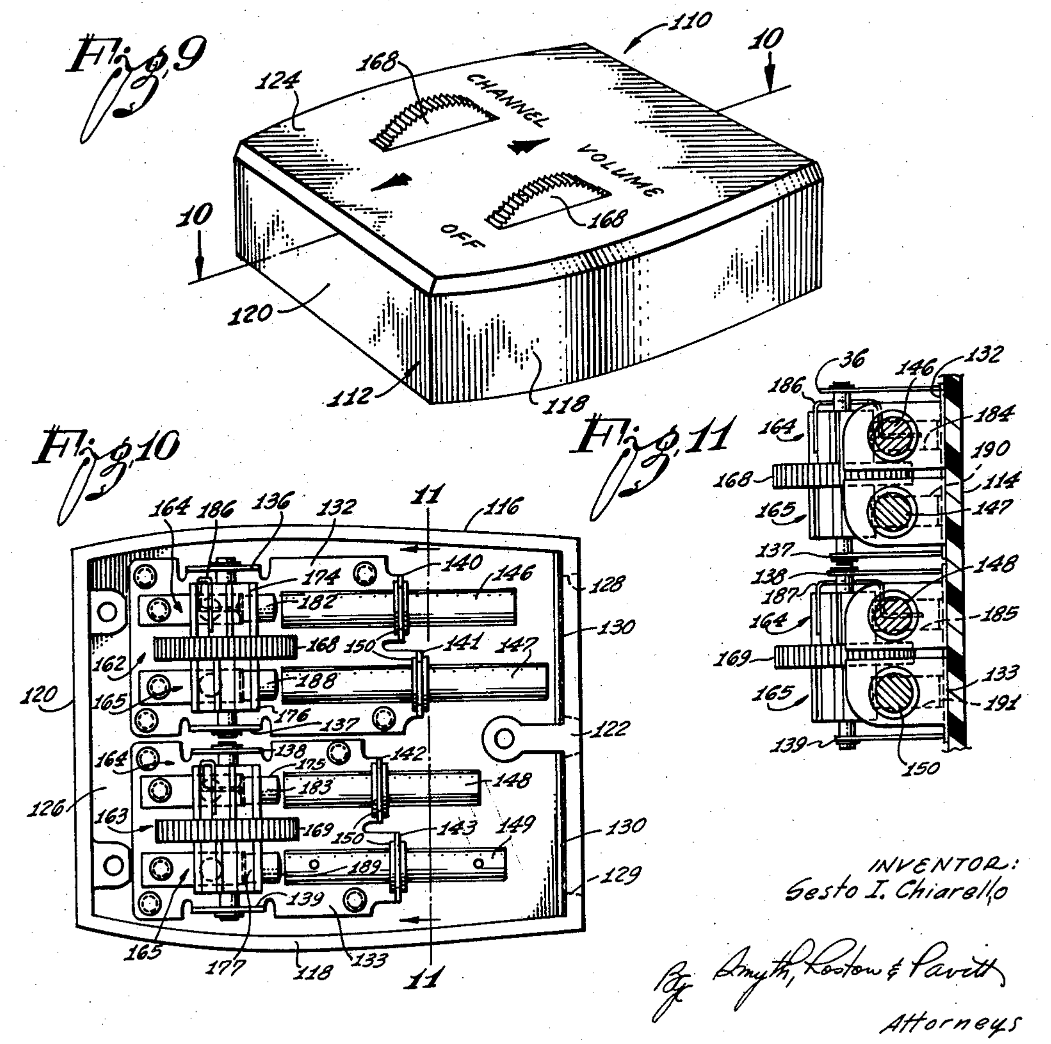
FIGURE 9 is a perspective view similar to FIGURE 1 but showing another embodiment of the present invention.
FIGURE 10 is a plan cross-sectional view taken substantially as indicated by the line 10—10 in FIGURE 9.
FIGURE 11 is a transverse cross-sectional view taken substantially along the line 11—11 in FIGURE 10.

Thus, when using the embodiment of FIGURES 9, 10 and 11 if it is desired to increase the volume of the television set, the wheel 168 may be rotated in one direction to excite rod 146 and mute rod 147 while, if it is desired to decrease the volume, the wheel 168 may be rotated in the opposite direction to excite rod 147 and mute rod 146. Similarly, if it is desired to change the station, the wheel 169 may be rotated in one direction to excite rod 148 and mute rod 149 or conversely, it may be rotated in the reverse direction to excite rod 149 and mute rod 148.

It may thus be seen that a new and improved remote control transmitter has been provided which will be simple to operate and in which the controls correspond in number and manner of operation to the controls on the television set.

Figure 12:
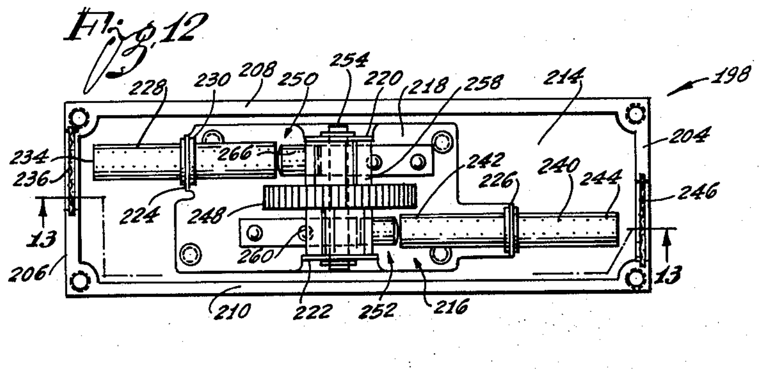
FIGURE 12 is a plan view of a portion of a transmitter embodying another form of the present invention.
Figure 13:
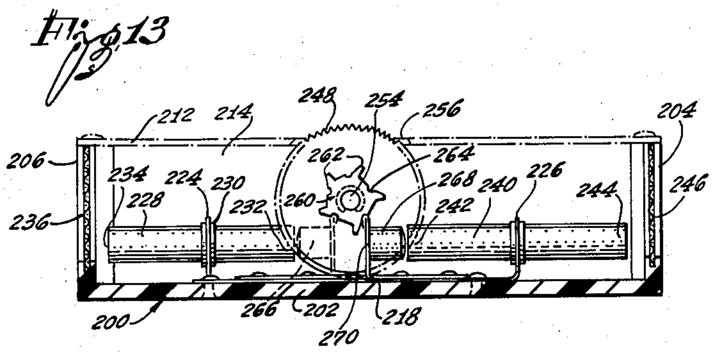
FIGURE 13 is a cross-sectional view taken substantially along the plane of line 13—13 in FIGURE 12.

As an alternative the embodiment of FIGURES 12 and 13 may be employed. In this embodiment the transmitter 198 comprises a housing 200 that is of the right size and shape to be hand held while being employed to transmit a control signal. The housing may be molded out of plastic so as to have a bottom 202 with a pair of upwardly projecting end walls 204 and 206 and a pair of side walls 208 and 210. A cover 212 may be removably secured to the walls 204, 206, 208 and 210 inclusive to enclose the space therebetween and form a chamber 214.

A metal frame 216 may be provided in the chamber 214 for supporting the operative elements of the transmitter 198 therein. The frame 216 includes a flat base 218 which may be secured to the bottom 202 by any suitable means such as a plurality of rivets. A pair of parallel flanges 220 and 222 may project upwardly from the opposite sides thereof of the frame while a finger 224 or 226 projects upwardly from each of the opposite ends of base 218 adjacent diametrically opposite corners thereof.

A first tuning rod 228, having a natural resonant frequency equal to one of the frequencies to be transmitted may be secured in one of the fingers 224 by means of a resilient grommet 230. The inner end 232 terminates adjacent one of the flanges 220 while the outer end 234 terminates adjacent the end wall 206. The portion of the end wall 206 in direct alignment with the outer end 234 of the rod 228 may have an opening therein through which the signals may be transmitted. If desired a screen 236 may be provided over the opening.

A second tuning rod 240 having a natural resonant frequency equal to the other of the frequencies to be transmitted may be secured in the other finger 226. The inner end 242 of this rod 240 may terminate adjacent the other flange 222 while the outer end 244 terminates adjacent the end wall 204. The portion of the end wall 204 in direct alignment with the outer end 244 may have a second opening or window 246 through which the signal may be transmitted.

In order to actuate or excite the rods 228 and 240 into vibrating, a striker assembly may be provided. In the present instance, this assembly includes a manually rotatable wheel 248, a first hammer 250 and a second hammer 252. The wheel 248 is preferably an integral molded structure that has a steel shaft 254 projecting from the opposite sides thereof. The ends of the shaft 254 are disposed in openings in the upper ends of the flanges 220 and 222 so as to extend transversely across the space therebetween. The periphery of the wheel 248 may include a plurality of serrations and project outwardly through an opening 256 in the center of the cover 212. Each side of the wheel 248 may also include a cog wheel 258 and 260. Each of the cog wheels 258 and 260 are substantialy identical and include a series of projecting teeth 262 and a series of detents 264 that are circumferentially spaced therearound.

The hammer 252 includes a small metal cylinder 268 mounted on a spring 270 that projects upwardly from the base 218 and is folded and positioned to engage cog wheel 260. As a result, when the wheel 248 is rotated clockwise it will cause the spring 270 to ride over the end of a tooth 262 on the cog wheel 260 and strike the end 242 of the rod 240. When rotated in the opposite direction, the cylinder 268 will be moved against the end 242 of the rod 240 and dampen vibrations therein.

The hammer 250 is similar to hammer 252 in that it includes a small metal cylinder 266 that is secured to the upper end of a spring. This spring is similar to spring 270 and consists of a strip of resilient material that has the base thereof secured to the base 218 of the frame 216. The upper end of the spring projects upwardly therefrom so as to position the cylinder 266 immediately adjacent the end of the rod 228. In addition the upper end of the spring includes a folded portion that will be engaged by the teeth 262 on the cog wheel 258 and biased against the end 232 of the tuning rod 228 to dampen vibrations therein when the wheel 248 is rotated clockwise (as seen in FIGURE 13). When the wheel 248 is rotated in the opposite direction the folded end will ride over the end of the next succeeding tooth to percussively strike the end of the rod 228 and cause it to vibrate.

It may thus be seen that if it is desired to employ this transmitter 198 to transmit a control signal, the appropriate end 204 or 206 of the transmitter 198 is aimed at the device to be controlled. The top of the wheel 248 is then rotated toward the device or away from the operator. This will cause a tooth 262 on the wheel 258 or 260 to cock a spring and then release a metal cylinder 266 or 268 so as to strike one end of one of the rods 228 or 240. This will cause the rod to be excited into vibrating and radiating a beam of sound of the desired frequency through window 236 or 246 to the controlled unit.

If it is desired to transmit the other control signal, the opposite end 206 or 204 of the transmitter 198 is aimed at the device to be controlled. The top of the wheel 248 is again rotated toward the controlled unit or away from the operator. This in turn will cause the other hammer to strike the other rod and cause it to radiate sound of the other frequency through the other window.

Figure 14:
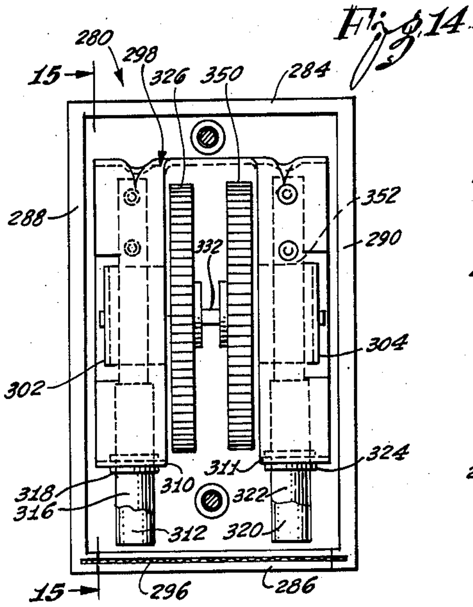
FIGURE 14 is a plan view of a portion of a transmitter embodying another form of the present invention.
Figure 15:
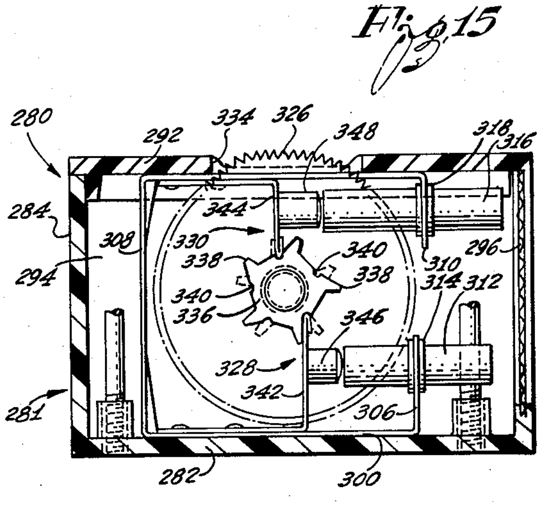
FIGURE 15 is a cross-sectional view taken substantially along the plane of line 15—15 in FIGURE 14.

As a still further alternative, the embodiment of FIGURES 14 and 15 may be employed. In this embodiment, the transmitter 280 is similar to the embodiment in FIGURES 9, 10 and 11 in that it may transmit two pairs of signals. The transmitter 280 comprises a housing 281 that is of a size and shape suitable for being hand held while transmitting signals. It may be a plastic molding with a bottom 282 with a pair of upwardly projecting end walls 284 and 286 and a pair of side walls 288 and 290. A cover 292 may be removably secured to the walls 284 to 290, inclusive, to enclose the space therebetween and form a chamber 294. The end wall 286 includes an enlarged opening that may be covered by a screen 296 suitable for permitting the passage of the sonic signals therethrough.

A metal frame 298 may be provided in the chamber 294 for supporting the operative elements of the transmitter 280 therein. The frame 298 includes a flat base 300 that is secured to the bottom 282 by any suitable means such as a plurality of rivets. The frame 298 also includes a pair of parallel flanges 302 and 304 that extend along the opposite sides thereof. A first pair of fingers 306–307 project upwardly from the end of base 300 adjacent the screen 296. The opposite end of the frame 298 includes a portion 308 that extends upwardly toward the cover 292. This portion 308 then extends along the inside of the cover 292 toward the screen 296 and forms a second pair of downwardly projecting fingers 310–311 that are in substantial alignment with the first fingers 306 and 307.

A first pair of tuning rods 312 and 316 having natural resonant frequencies equal to two of the frequencies to be transmitted may be secured in the fingers 306 and 310 by means of resilient grommets 314 and 318. The inner end of the first rod 312 terminates adjacent the side flange 302 while the outer end of the rod 312 terminates adjacent the screen 296 so as to be able to radiate the signals therethrough. The second tuning rod 316, having a natural resonant frequency equal to a second frequency to be transmitted may be secured in the other of the fingers 310 by means of a resilient grommet 318. The inner end of this rod 316 terminates adjacent the side flanges 302 but above the inner end of the first rod 312. The outer end of the rod 316 will also terminated adjacent the screen 296 so as to be able to radiate sound therethrough.

A second pair of tuning rods 320 and 322 having natural resonant frequencies equal to the other two of the frequencies to be transmitted may be secured in the fingers 307 and 311 by means of resilient grommets 324. The inner ends of the rods terminate adjacent the side flange 304 while the outer ends thereof terminate adjacent the screen 296 so as to transmit the sonic signals therethrough.

In order to actuate or excite these rods 312 and 316 into vibrating and radiating the desired signals, a separate striker assembly may be provided for each pair of rods 312 and 316 and 320 and 322. In the present instance, the first assembly includes a manually rotatable wheel 326, a first hammer 328 and a second hammer 330. The wheel 326 is preferably an integral molded structure mounted on a steel shaft 332. The shaft 332 extends across the space between the flanges 302 and 304 and has the ends thereof disposed in openings in the flanges 302 and 304 so as to rotatably support the wheel 326. The periphery of the wheel 326 which has a plurality of serrations thereon projects through an opening 334 in the cover 292 so that the operator may conveniently rotate the wheel 326 in either direction while hand holding the transmitter 280. One side of the wheel 326 may also have molded integral therewith a cog wheel 336 which includes a series of projecting teeth 338 and a series of detents 340 that are interspersed therebetween. A first spring 342 is secured to the base 300 so that the end thereof will extend upward and engage the cog wheel 336. A second spring 344 is secured to the top of the frame 298 so as to extend downward with the end thereof engaging the top of the cog wheel 336. Metal cylinders 346 and 348 may be secured to the ends of the springs 342 and 344 respectively so as to engage the ends of the rods 312 and 316 respectively.

It will be seen that when the wheel 336 is rotated clockwise (see FIGURE 15) the detents 340 and teeth 338 will cause the spring 344 to urge the cylinder 348 against the rod 316 and dampen vibrations therein. At the same time the teeth 338 will deflect and release spring 342 so as to cause the cylinder 346 to strike the rod 312 and cause it to vibrate whereby a sonic signal will be radiated through the screen 296. If the wheel 326 is rotated in the reverse direction (counterclockwise in FIGURE 15) cylinder 346 will be forced against the rod 312 so as to dampen vibrations therein while cylinder 348 will strike the rod 316 and cause it to radiate a signal of a different frequency.

The second striker assembly is a mirror image of the first striker assembly and includes a wheel 350 that is mounted on the shaft 332 so that the periphery will project above the cover 292. The wheel 350 includes a cog wheel 352 on the side thereof which is substantially identical to the cog wheel 336 and is adapted to alternatively deflect leaf springs similar to springs 342 and 344 to cause metal cylinders therein similar to cylinders 346 and 348 to selectively strike the tuning rods 320 and 322 and excite them into radiating signals through the screen 296.

It may thus be seen that by rotating the wheel 326 in either direction control signal will be radiated through the screen 296 that have frequencies equal to the resonant frequencies of the rods 312 and 316. Alternatively by rotating the control wheel 350 in either direction control signals will be radiated that have frequencies equal to the resonant frequencies of the rods 320 and 322.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a device of the class described, the combination of a support, a first elongated tuning rod mounted on said support and adapted to vibrate at a first frequency, a second elongated tuning rod mounted on said support substantially parallel to said first rod and adapted to vibrate at a second frequency, a first hammer mounted on said support adjacent one end of said first tuning rod, said hammer being positioned to strike said end to thereby excite said first rod into vibrating at said first frequency, a second hammer mounted on one end of said first rod, said second hammer being positioned to strike said second end to thereby excite said second rod into vibrating at said second frequency, a manually movable control member mounted on said support, adjacent said tuning rods and being movable in directions parallel to said tuning rods, said control member being operatively connected to said first hammer for causing said hammer to strike said first member only when said control member is moved in one direction, said control member being operatively connected to said second member for causing said second hammer to strike said second member only when said control member is moved in the opposite direction.

2. In a device of the class described, the combination of a housing frame disposed in said housing, a first tuning rod member mounted on said frame and adapted to vibrate at a first frequency, a second tuning rod member mounted on said frame substantially parallel to said first rod member and adapted to vibrate at a second frequency, a first hammer mounted on said frame and positioned to contact said first tuning rod member, a second hammer mounted on said frame and positioned to engage said second tuning rod member, a manually movable control member mounted on said frame and operatively connected to said hammers, said control member having a portion thereof exposed from said housing and movable in directions parallel to the axis of said rods, said control member being effective to cause said first hammer to strike said first member to thereby excite said first member into vibrating at said first frequency and to cause said second hammer to contact said second member to thereby prevent vibrations therein when said portion is moved in the first direction, said control member being effective to cause said second hammer to strike said second member to thereby excite said second member into vibrating at said second frequency and to cause said first hammer to contact said first member to prevent vibrations thereon when said portion is moved in the opposite direction.

3. In a device of the class described, the combination of a supporting frame, a plurality of elongated members mounted on said supporting frame substantially parallel to each other, each of said members being adapted to vibrate at a frequency differing from that of another member, a striker assembly mounted on said frame and having hammer means for striking preselected ones of said members for causing vibrations thereof, said assembly including control means having a portion manually movable in directions parallel to the axes of said elongated members for causing said hammer means to strike at least one of said members when said control means moves in one direction and to cause said hammer means to strike at least one other of said members when said control means moves in an opposite direction.

4. A transmitter for generating signals of different frequencies, said transmitter comprising a housing, a support disposed inside of said housing, a pair of elongated tning rod members mounted on said support inside of said housing, each of said members being adapted to vibrate at a frequency differing from that of the other member, a striker assembly mounted on said support and including a separate hammer adjacent each of said tuning members, said striker assembly including a manually actuatable means having a portion thereof exposed through said housing and movable in opposite directions parallel to the axes of said tuning rod members, said means being effective for causing one of said hammers to strike one of said members when said portion moves in one direction and causing the other of said hammers to strike the other of said members when said portion moves in the opposite direction.

5. A transmitter for generating signals of different frequencies comprising a supporting frame, a pair of members mounted on said frame substantially parallel to each other, each of said members being adapted to vibrate at a frequency differing from that of the other member, a first hammer resiliently mounted on said frame adjacent one of said members for striking that member, a second hammer resiliently mounted on said frame adjacent the other of said members for striking the other of said members, a manually rotatable wheel rotatably mounted on said frame in a plane substantially parallel to said members, said hammers being operatively connected to said wheel whereby rotation of said wheel in one direction will cause one of said hammers to strike one of said members and rotation of said wheel in the other direction will cause the other of said hammers to strike the other of said members.

6. A transmitter for generating signals of different frequencies comprising a supporting frame, a pair of members mounted on said frame substantially parallel to each other, each of said members being adapted to vibrate at a frequency differing from that of the other member, a first hammer mounted on a spring secured to said frame adjacent one of said members for striking that member, a second hammer mounted on a second spring secured to said frame adjacent the other of said members for striking the other of said members, a manually rotatable wheel mounted on said frame and rotatable in a plane substantially parallel to said tuning rod members, said wheel including detent means thereon operatively interconnected with said springs whereby rotation of said wheel in one direction will cause one of said hammers to strike one of said members and rotation of said wheel in the opposite direction will cause the other of said hammers to strike the other of said members.

7. A transmitter for generating signals of different frequencies comprising a supporting frame, a first member mounted on said frame and adapted to vibrate at a first frequency when struck, a second member mounted on said frame adjacent said first member, said second member being adapted to vibrate at a second frequency when struck, first and second springs secured to said frame, a hammer secured to each of said springs and adapted to move against one of said members, a manually rotatable wheel rotatably mounted on said frame, detent means on said wheel to engage said first and second springs, said detent means being adapted to force the first of said hammers against said first members when said wheel is rotated in one direction and to deflect and release one of said springs so that said second hammer will strike said second member, said detent means when said wheel is rotated in the opposite direction being adapted to force the second of said hammers against said second member when said wheel is rotated in the opposite direction and to deflect and release the other of said springs so that said first hammer will strike said first member.

8. A transmitter for generating signals of different frequencies comprising a supporting frame, a manually rotatable wheel mounted on said frame, said wheel having integral therewith detent means, first and second tuning rods supported on said frame with one end of each rod being disposed adjacent said wheel, a spring secured to said frame and having one end thereof positioned to engage said detent means on said wheel, a member on said spring adapted to engage the first of said tuning rods when said spring is deflected, a second spring secured to said frame and having one end thereof engaging said detent at a point diametrically opposite from said first spring, and a member on said spring adapted to engage said second tuning rod when said spring is deflected.

9. A transmitter for generating a plurality of pairs of signals having different frequencies, said transmitter comprising a plurality of pairs of tuning rods each of which is adapted to vibrate at a different frequency, a separate control wheel for each of said pairs of tuning rods, each of said control wheels having only a limited portion of its periphery exposed for having forces manually applied thereto for rotating the wheel in opposite directions, means interconnecting each of said control wheels with a pair of said tuning rods to excite one of the tuning rods in said pair when the wheel is rotated in one direction and to excite the other of the tuning rods in said pair into vibrating when the wheel is rotated in the opposite direction.

10. In a device of the class described, the combination of:

a first elongated rod adapted to vibrate at a first predetermined frequency, a first striker assembly disposed adjacent the first rod for striking said first rod, a second elongated rod disposed parallel to said first rod and adapted to vibrate at a second predetermined frequency, a second striker assembly disposed adjacent the second rod for striking said second rod, a control member disposed adjacent said first and second elongated rods, said control member having an exposed control area movable in a first direction parallel to the rods in response to a manual force on said control area in a first direction and in a second and opposite direction in response to a manual force on said control area, first one way drive means on the control member for actuating the first striker assembly to excite the first tuning rod into vibrating when the control member is moved in the first direction to excite the first tuning rod, and second one way drive means on the control member for actuating the second striker assembly to excite the second tuning rod into vibrating when the control member is moved in the second direction.

11. A transmitter for radiating control signals of a first frequency and control signals of a second frequency, said transmitter comprising:

a housing, a first tuning member disposed in said housing and adapted to radiate vibrations of a first frequency, a first striker assembly positioned adjacent said tuning member for striking said tuning member into vibrating, a second tuning member disposed in said housing substantially parallel to said first tuning member and adapted to radiate vibrations of a second frequency, a second striker assembly positioned adjacent the second tuning member for striking said tuning member into vibrating, a manually actuatable control wheel disposed in said housing and movable in opposite directions parallel to said tuning members, detent means on said wheel to engage and actuate the first striker to excite said first tuning rod to radiate signals of said first frequency when the control means is moved in the one direction and to engage and actuate the second striker to excite said second tuning rod to radiate signals of said second frequency when the control means is moved in the opposite direction.

12. A transmitter for generating sonic signals of different frequencies, comprising:

an elongated housing having a first open end and a second open end opposite from the first end, a control member movably mounted in said housing intermediate said ends, said member having a portion thereof projecting from said housing to form a control area that may be manually movable in two opposite ways by the application of manual forces of opposite directions to said area, a first tuning rod having a natural resonant frequency equal to one of said signal frequencies for radiating sonic signals of that frequency from the first end of said rod, said rod being disposed on one side of said control member and extending longitudinally of said housing from said control member in a first direction with the end of the rod positioned adjacent the first end of the housing for radiating sonic signals through the open end in said first direction, a second tuning rod having a natural resonant frequency equal to another of said signal frequencies and being effective to radiate sonic signals of a second frequency from an end of the second tuning rod, said second tuning rod being disposed on the opposite side of said control member and extending longitudinally of said housing from said member in the opposite direction from the first tuning rod, one end of the second tuning rod being positioned adjacent the second end of the housing from radiating a sonic signal of the second frequency from the second end of the housing and in the direction opposite from the first direction, and a separate striker assembly for each of said rods, one of said striker assemblies being disposed in said housing on one said of the control member and interconnected with the control member so as to be effective to excite the first tuning rods whenever said control member is moved in a first way, the other of said striker assemblies being positioned on the opposite side of the control member and interconnected with the control member so as to be effective to excite the second of the tuning rods when the control member is moved in the opposite way.

13. A transmitter for generating sonic signals of different frequencies, comprising:

a housing having a first open end and a second open end opposite from the first end, at least one control wheel disposed in said housing with a portion thereof projecting from said housing, first drive means on one side of the wheel and second drive means on the opposite side of the wheel, a first tuning rod disposed in said housing and having a natural resonant frequency equal to the frequency of one of said signals, said tuning rod having a first end thereof disposed adjacent the first drive means and a second end disposed adjacent the first open end of the housing for radiating signals of said frequency through the first end of the housing in a first direction, a striker assembly disposed adjacent the first end of the tuning rod for striking said first end, a second tuning rod disposed in said housing and having a second natural resonant frequency equal to the frequency of a second signal, said second tuning rod being substantially parallel to said first rod and having a first end disposed adjacent the second drive means and a second end disposed adjacent the second end of said housing for radiating signals of the second frequency from the second end of the housing in a second direction, a second striker assembly disposed adjacent the first end of the second tuning rod for striking said second tuning rod, the first drive means including one way means for engaging the first striker assembly for striking the first end of the first tuning rod when the wheel rotates in a first direction, and the second drive means including one way means for engaging the second striker assembly for percussively striking the first end of the second rod when said wheel rotates in the opposite direction.

14. A transmitter for generating sonic signals of different frequencies, comprising the combination of:

a housing for being hand held, said housing having a top side and a bottom side and an open end for radiating sonic signals, a first resonant tuning rod having a first resonant frequency, said member being mounted inside of said housing adjacent the top side and being free to vibrate therein at its predetermined resonant frequency, said resonant member having one end disposed adjacent the open end of the housing for radiating said frequency therethrough.

a second resonant tuning rod having a second resonant frequency that differs from said first frequency, said second member being mounted inside of said housing adjacent the bottom side parallel to the first resonant tuning rod, said second resonant tuning rod being free to vibrate at its resonant frequency and having one end disposed adjacent to the open end of the housing from radiating said frequency therethrough, a control wheel mounted in said housing for revolving around an axis disposed between the tuning rods and having a control surface projecting from one of the sides of said housing member, said control surface being positioned to have a manual force applied thereto in a first direction to rotate said control wheel in a first direction and being positioned to have a manual force applied thereto in a second direction to rotate said control wheel in a second direction, drive means on said control wheel to rotate therewith, means operatively interconnected with drive means to excite the first tuning rod into vibrating when said wheel moves in said first direction, and means operatively interconnected with the drive means to excite the second tuning rod into vibrating when said control member moves in said second direction.

References Cited in the file of this patent

UNITED STATES PATENTS

| | | |
|---|---|---|
| 2,954,545 | Drake | Sept. 27, 1960 |
| 2,992,412 | Spindler | July 11, 1961 |
| 3,017,849 | Grossenheider | Jan. 23, 1962 |